UNITED STATES PATENT OFFICE.

HERMANN MÜLLER-THURGAU, OF WAEDENSWEIL, SWITZERLAND.

PROCESS OF COLORING AND PRESERVING FRUIT-JUICES.

SPECIFICATION forming part of Letters Patent No. 606,976, dated July 5, 1898.

Application filed February 1, 1897. Serial No. 621,558. (No specimens.) Patented in Italy December 21, 1896, XXXII, 43,525, LXXXVI, 403; in France December 22, 1896, No. 262,426; in Belgium December 24, 1896, No. 125,362; in Tunis December 28, 1896, No. 214; in Hungary January 7, 1897, No. 8,249; in England January 13, 1897, No. 978; in Turkey January 29, 1897, No. 558; in Cape Colony February 6, 1897, No. 6/170; in New South Wales February 22, 1897, No. 7,283; in South Australia February 22, 1897, No. 3,561; in Victoria February 24, 1897, No. 13,973; in Canada May 1, 1897, No. 55,759; in Austria August 27, 1897, No. 47/3,102; in South African Republic September 3, 1897, No. 1,496; in Portugal September 4, 1897, No. 2,391; in India September 21, 1897, No. 78, and in Spain December 29, 1897, No. 20,164.

*To all whom it may concern:*

Be it known that I, HERMANN MÜLLER-THURGAU, a citizen of the Republic of Switzerland, residing at Waedensweil, in the Republic of Switzerland, have invented certain new and useful improvements in processes for the production of non-alcoholic or feebly-alcoholic fruit-juices (fruit and grape wines) which may be kept or preserved without change, (for which Letters Patent have been granted in the following countries: Belgium, No. 125,362, dated December 24—31, 1896; Canada, No. 55,759, dated May 1, 1897; Great Britain, No. 978, dated January 13, 1897; France, No. 262,426, dated December 22, 1896; British India, No. 78, dated September 21, 1897; Italy, Reg. Gen., XXXII, 43,525, Reg. Att., LXXXVI, 403, dated December 21—31, 1896; Cape Colony, No. 6/170(653), dated February 6, 1897; New South Wales, No. 7,283, dated February 22, 1897; Austria, No. 47/3,102, dated August 27, 1897; South Australia, No. 3,561, dated February 22, 1897; Spain, No. 20,164, dated December 29, 1897; Transvaal, (South African Republic,) No. 1,496, dated September 3, 1897; Tunis, No. 214, dated December 28, 1896; Turkey, No. 558, dated January 29, 1897; Hungary, No. 8,249, dated January 7, 1897; Victoria, No. 13,973, dated February 24, 1897, and Portugal, No. 2,391, dated September 4, 1897;) and I do hereby declare the following to be a full, clear, and exact description of the invention, such as will enable others skilled in the art to which it appertains to make and use the same.

As is known, the alcoholic fermentation of the juice of fruits is due to the presence or the introduction therein of bacteria, microscopical mushrooms or fungi, and particularly of the yeast-microbe.

This invention for a process for the production of preservable non-alcoholic or feebly-alcoholic fruit-juices (fruit or grape wines) has for its object to kill the fermentation-producing microbes contained in the liquid and to prevent or arrest the fermentation and obtain a non-alcoholic or slightly-alcoholic drink that will keep as well as a fermented drink.

In carrying out this invention the pieces of fresh fruits (various fruits, grapes, &c.) separated from the skins and stones are submitted out of contact with the air to the action of steam or hot water in such manner that they are raised to a temperature of about 60° to 70° Celsius for about half an hour. By this heating the mucilaginous substances which may be in suspension in the liquid fall as a flocculent precipitate and the microbes, &c., are killed. After this heating the liquid is conveyed by sterilized pipes into sterilized containers which have been submitted for a quarter of an hour to the action of steam or hot water. The air entering these containers after their sterilization is obliged to pass through an air-filter. The liquid is allowed to rest a certain time in these containers, so as to allow the disturbing substances to in a large measure deposit themselves. The liquid is then filtered in suitable apparatus (the operation would not be possible before heating on account of the large quantity of mucilaginous substances contained in the liquid) and again submitted for about half an hour, not in contact with air, to a temperature of about 60° to 70° Celsius, so as to destroy the bacteria, mushrooms, or fungi which might have become introduced during the operations of filtering and filling.

As is known, the coloring-matter contained in the skin (peel, husk, &c.) of certain fruits, notably red and blue grapes, is only dissolved in the juices of these fruits on the alcoholic fermentation thereof, and this is why to obtain colored juices the skins are submitted to fermentation at the same time as the juice. With my process if it is desired to obtain fruit-juices colored naturally, without their being alcoholic, it is necessary that the coloring-matter be introduced into the juice in a special manner. I can proceed with this object in two different manners: First, the juice is submitted for several minutes at the same time as the skin to the action of heat of about 60° Celsius. By this heating the color-cells of the fruit-skins open so that the coloring-matter can mix with the juice. The juice is then separated from the skins and the process above described is applied. Second, the juice separated from the skins is first heated to 60° Celsius and then conducted through a suitable reservoir which contains the skins. The color-cells of these skins are then opened by the heat and the coloring-matter can mix with the juice. Only after this mixing is the juice submitted to the process above described.

If instead of operating on the fresh juice the fermentation is allowed to establish itself, drinks are obtained slightly alcoholic to the desired degree, according to the time during which the fermentation takes place—that is to say, depending on the moment when the juice is submitted to the above-mentioned process.

I claim—

1. A process for the production of preservable fruit-juices consisting in subjecting fermented or unfermented juices for about half an hour to a temperature of about 60° to 70° Celsius, in then removing the matters in suspension, and finally subjecting the juices to another similar heating, the whole process being carried out, out of contact with the air.

2. The herein-described process of treating fresh fruit-juice to render it preservable, which consists in heating the juice out of contact with the air, by steam or hot water, to about 60° or 70° Celsius, to destroy the germs of fermentation and precipitate the mucilaginous substances held in suspension, then causing the settling of the juice to deposit the disturbing substances or sediment, then filtering the juice and finally subjecting it to a reheating out of contact with the air at 60° to 70° Celsius, to destroy any germs of fermentation that may have entered the juice during the process of filtration.

3. The herein-described process of treating fresh fruit-juice to color naturally and render it preservable, which consists in heating the juice in contact with the skins or outer covering of the fruit and at a temperature to open the color-cells, and extract the coloring-matter, &c., then subjecting the juice, out of contact with the air, to steam or hot-water heat of about 60° to 70° Celsius, to precipitate mucilaginous substances and destroy the germs of fermentation, then causing the settling of the juice to deposit disturbing substances or sediment, then filtering the juice and finally subjecting the juice to a reheating, out of contact with the air, at a temperature of about 60° to 70° Celsius.

In testimony whereof I have affixed my signature in presence of two witnesses.

HERMANN MÜLLER-THURGAU.

Witnesses:
 ED. V. WALDKIRCH,
 HHALEHART.